United States Patent
Mimura

(10) Patent No.: US 10,746,404 B2
(45) Date of Patent: Aug. 18, 2020

(54) HYDROGEN GAS BURNER DEVICE

(71) Applicant: TOYOTA JIDOSHA KABUSHIKI KAISHA, Toyota-shi (JP)

(72) Inventor: Kenshiro Mimura, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 368 days.

(21) Appl. No.: 15/889,725

(22) Filed: Feb. 6, 2018

(65) Prior Publication Data

US 2018/0224122 A1 Aug. 9, 2018

(30) Foreign Application Priority Data

Feb. 8, 2017 (JP) ................................. 2017-021250

(51) Int. Cl.
*F23N 1/00* (2006.01)
*F23N 1/02* (2006.01)
(Continued)

(52) U.S. Cl.
CPC ............ *F23N 1/002* (2013.01); *F23D 14/66* (2013.01); *F23K 5/007* (2013.01); *F23N 1/005* (2013.01);
(Continued)

(58) Field of Classification Search
CPC ..... F23N 1/00; F23N 1/02; F23K 5/00; F23K 5/20; F23K 5/02; F23K 5/24; F23D 14/68
See application file for complete search history.

(56) References Cited

U.S. PATENT DOCUMENTS 3,982,878 A * 9/1976 Yamane ................. F02B 43/10
431/2
4,074,708 A * 2/1978 Hochmuth ............. F22B 1/003
122/479.7
(Continued)

FOREIGN PATENT DOCUMENTS

| JP | 2013-29265 | | 2/2013 | |
|---|---|---|---|---|
| JP | 5817975 | | 11/2015 | |
| JP | 2016109352 | A * | 6/2016 | |
| JP | 2016-166683 | | 9/2016 | |
| JP | 2018200166 | A * | 12/2018 | ............... F23K 5/00 |
| JP | 2019039636 | A * | 3/2019 | |

OTHER PUBLICATIONS

"Search_Report_by_Registered_Search_Organization_(TRANSLATED).pdf", International Search Report, dated Aug. 16, 2019. (Year: 2019).*

*Primary Examiner* — Steven B McAllister
*Assistant Examiner* — Daniel E. Namay
(74) *Attorney, Agent, or Firm* — Oblon, McClelland, Maier & Neustadt, L.L.P.

(57) ABSTRACT

A control device of a hydrogen gas burner device sets a target flow rate of a hydrogen gas such that a flow rate of the hydrogen gas decreases as a temperature of the hydrogen gas becomes higher, based on the temperature of the hydrogen gas and a needed quantity of heat of the hydrogen gas during the combustion, sets a target flow speed such that the flow speed of the hydrogen gas released from a combustion nozzle via a flow speed regulator becomes a flow speed based on the target flow rate and the flow speed of the hydrogen gas increases as a value of the target flow rate decreases, controls the flow rate regulator such that the flow rate of the hydrogen gas reaches the target flow rate, and controls the flow speed regulator such that the flow speed of the hydrogen gas reaches the target flow speed.

3 Claims, 7 Drawing Sheets

(51) Int. Cl.
  *F23K 5/00*  (2006.01)
  *F23N 5/14*  (2006.01)
  *F23D 14/66*  (2006.01)
  *F23K 5/20*  (2006.01)
  *F23N 5/02*  (2006.01)
  *F23N 5/24*  (2006.01)
  *F23D 14/68*  (2006.01)

(52) U.S. Cl.
  CPC ............ *F23N 1/022* (2013.01); *F23N 5/143* (2013.01); *F23C 2900/9901* (2013.01); *F23K 5/002* (2013.01); *F23K 5/005* (2013.01); *F23K 2401/10* (2013.01); *F23K 2401/201* (2013.01); *F23N 1/025* (2013.01); *F23N 2221/06* (2020.01); *F23N 2221/08* (2020.01); *F23N 2221/10* (2020.01); *F23N 2239/04* (2020.01)

(56) References Cited

U.S. PATENT DOCUMENTS

| | | | | |
|---|---|---|---|---|
| 5,449,854 | A * | 9/1995 | Yap | F23G 5/12 110/212 |
| 7,162,864 | B1 * | 1/2007 | Schefer | F23C 9/00 123/1 A |
| 8,726,693 | B2 * | 5/2014 | Inoue | C03B 37/01413 65/160 |
| 2003/0031971 | A1 * | 2/2003 | Sugimoto | F23C 13/00 431/268 |
| 2014/0150445 | A1 * | 6/2014 | Huntington | F23R 3/28 60/776 |
| 2015/0059353 | A1 * | 3/2015 | Asai | F02C 3/24 60/778 |
| 2017/0159930 | A1 * | 6/2017 | Lin | H01L 35/30 |

* cited by examiner

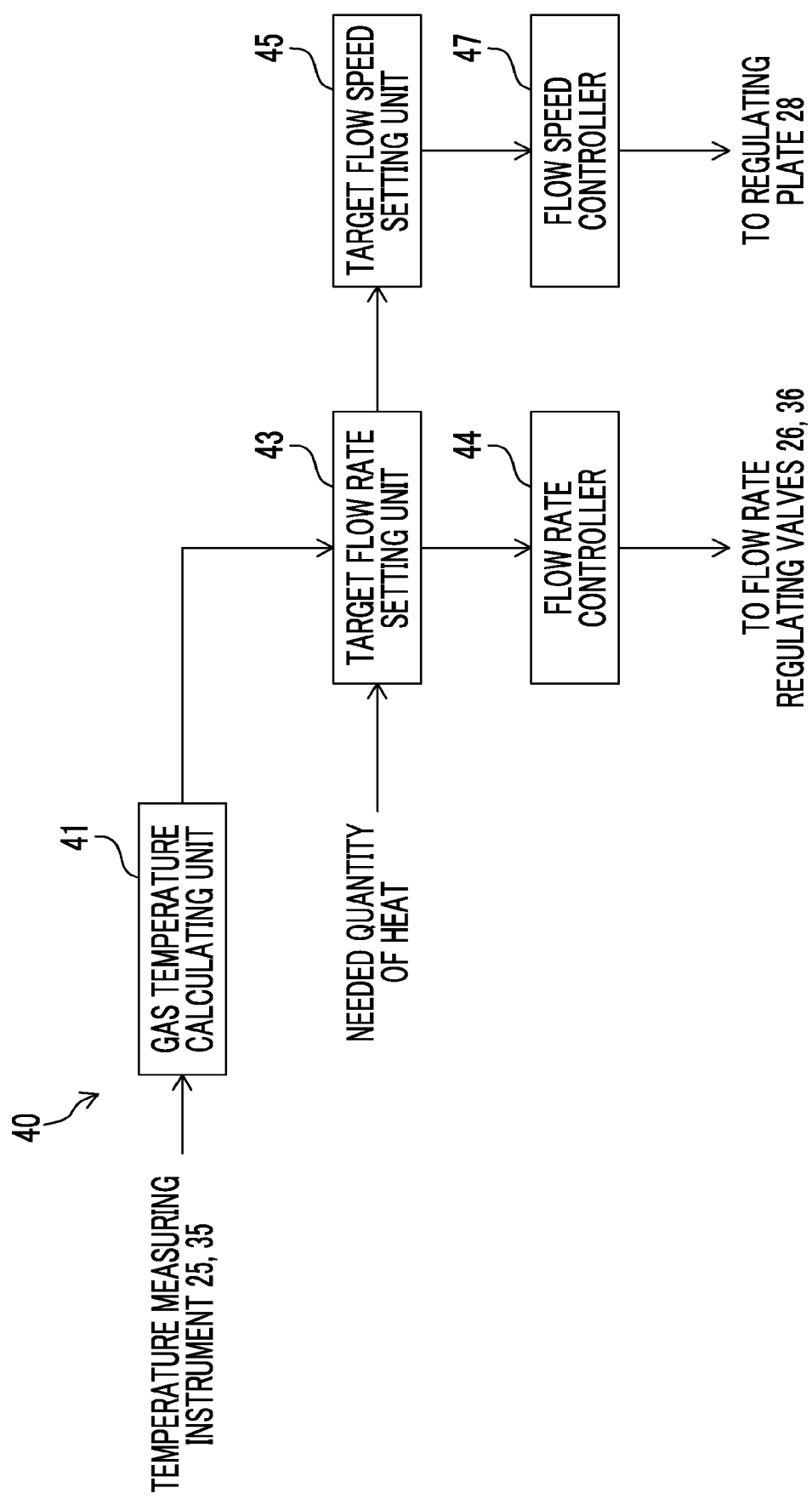

FIG. 3A
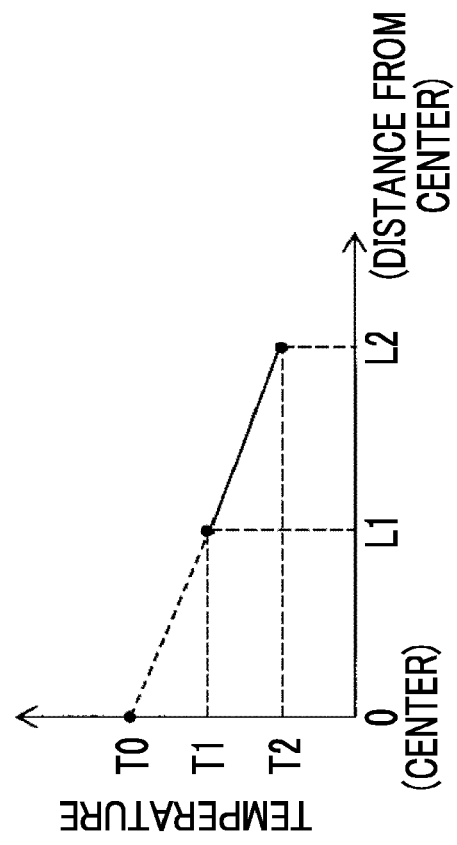
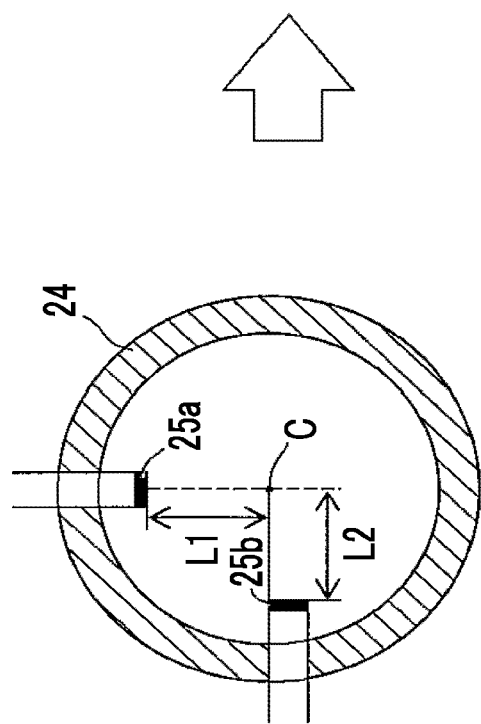

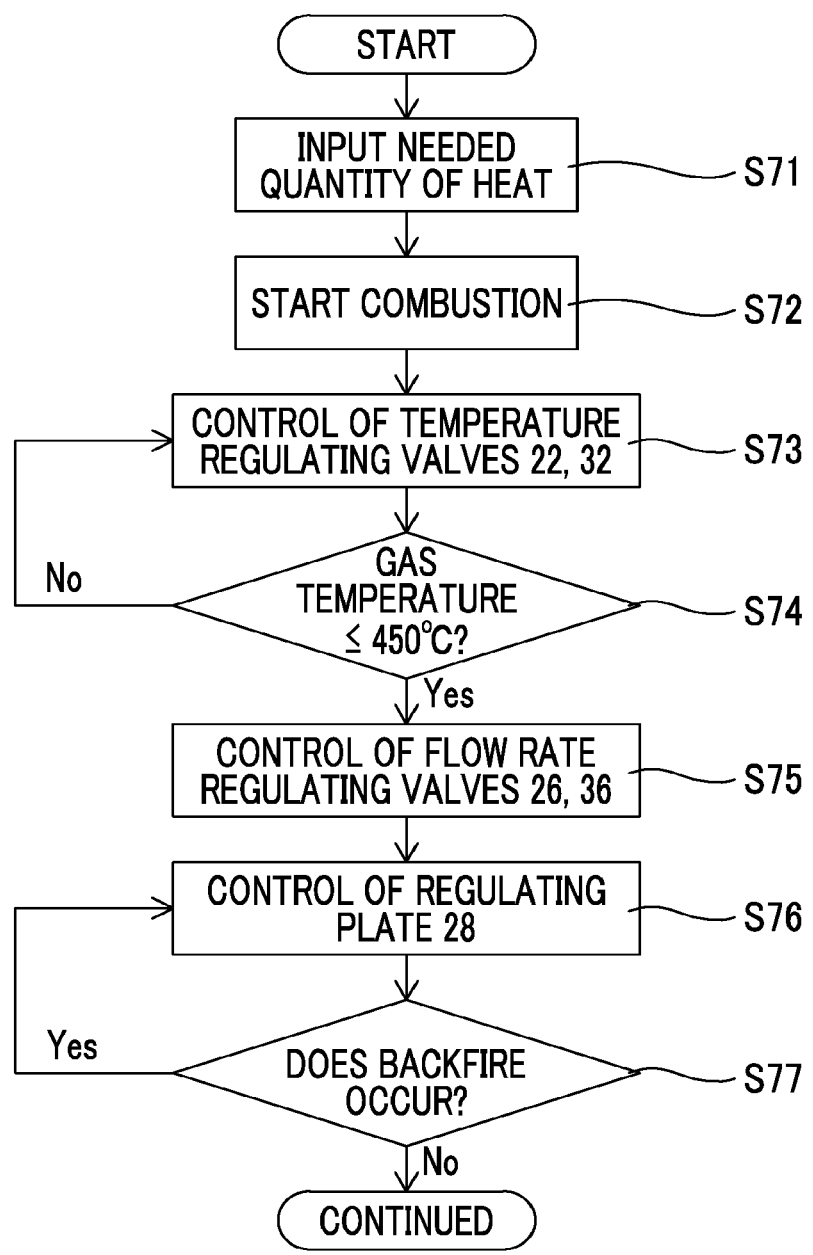

HYDROGEN GAS BURNER DEVICE

INCORPORATION BY REFERENCE

The disclosure of Japanese Patent Application No. 2017-021250 filed on Feb. 8, 2017 including the specification, drawings and abstract is incorporated herein by reference in its entirety.

BACKGROUND

1. Technical Field

The present disclosure relates to a hydrogen gas burner device using hydrogen gas for fuel gas.

2. Description of Related Art

In the related art, burner devices that generate flames by igniting combustible fuel with an ignition device have been suggested. For example, Japanese Unexamined Patent Application Publication No. 2013-029265 (JP 2013-029265 A) suggests a burner device that includes a fuel nozzle which sprays fuel and that regulates the flow rate of the fuel jetted from the fuel nozzle by controlling the aperture of the fuel nozzle.

Japanese Unexamined Patent Application Publication No. 2016-166683 (JP 2016-166683 A) suggests a gas burner device that generates flames by igniting air-fuel mixture, in which combustion air is mixed with fuel gas with an ignition device. The gas burner device includes a regulating valve that regulates the amounts of supply of the fuel gas and the combustion air to be supplied to the combustion nozzle, and heats the fuel gas and the combustion air to be supplied to the combustion nozzle, with the heat of exhaust Gas combusted with the gas burner device.

SUMMARY

However, in a case where the fuel gas before combustion is heated in advance as in the gas burner device of JP 2016-166683 A, the quantity of heat of the heated fuel gas is not taken into consideration with respect to a needed quantity of heat. Thus, the fuel gas with a flow rate more than needed may be supplied to the combustion nozzle.

Meanwhile, in a case where hydrogen gas is used for the fuel gas, the combustion speed of the hydrogen gas is higher than that of other fuel gas. Therefore, the combustion of the hydrogen gas progresses at a time before the hydrogen gas is diffused. Particularly, in a case where the hydrogen gas is heated as in the gas burner device of JP 2016-166683 A, the combustion speed of the hydrogen gas increases. For this reason, the temperature of a flame portion of the combusted hydrogen gas tends to be higher than that of a flame portion of combusted town gas or the like, NOx is generated by an oxidation reaction of $N_2$ in the air, and a relatively large amount of NOx is easily contained in an exhaust gas after combustion.

The present disclosure provides a hydrogen gas burner device that can supply hydrogen gas with a flow rate optimal for a needed quantity of heat to a combustion nozzle and that can further reduce the concentration of NOx generated by the combustion of the hydrogen gas.

An aspect of the present disclosure relates to a hydrogen gas burner device including a combustion nozzle to which hydrogen gas and combustion-supporting gas containing oxygen gas are supplied, a gas heater disposed upstream of the combustion nozzle, a flow rate regulator, a flow speed regulator disposed downstream of the flow rate regulator, and a control device configured to control the flow rate regulator and the flow speed regulator. The combustion nozzle is configured to combust the hydrogen gas. The gas heater is configured to heat at least the hydrogen gas. The flow rate regulator is configured to regulate a flow rate of the hydrogen gas to be heated by the gas heater and supplied to the combustion nozzle. The flow speed regulator is configured to regulate a flow speed of the hydrogen gas released from the combustion nozzle. The control device is configured to set a target flow rate of the hydrogen gas such that the flow rate of the hydrogen gas passing through the flow rate regulator decreases as a temperature of the hydrogen gas becomes higher, based on the temperature of the hydrogen gas heated by the gas heater, and a needed quantity of heat of the hydrogen gas needed for the hydrogen gas burner device during the combustion. The control device is configured to set a target flow speed such that the flow speed of the hydrogen gas released from the combustion nozzle via the flow speed regulator becomes a flow speed based on the target flow rate, and the flow speed of the hydrogen gas increases as a value of the target flow rate decreases. The control device is configured to control the flow rate regulator such that the flow rate of the hydrogen gas reaches the target flow rate and to control the flow speed regulator such that the flow speed of the hydrogen gas reaches the target flow speed.

The hydrogen gas burner device according to the aspect of the present disclosure may further include a temperature regulator configured to regulate the flow rate of the hydrogen gas to be heated by the gas heater so as to regulate the temperature of the hydrogen gas to be heated. The control device may be configured to control the temperature regulator so as to limit an upper limit temperature of the hydrogen gas to be heated by the gas heater.

In the hydrogen gas burner device according to the aspect of the present disclosure, the gas heater may be configured to heat the hydrogen gas and the combustion-supporting gas, and the control device may be configured to correct the set target flow speed based on a temperature of the combustion-supporting gas.

According to the aspect of the present disclosure, since the hydrogen gas before combustion is heated by the gas heater disposed upstream of the combustion nozzle, the quantity of heat generated during the combustion of the hydrogen gas can be compensated for. The flow rate of the heated hydrogen gas is regulated from the temperature and the needed quantity of heat of the hydrogen gas by the flow rate regulator such that the flow rate of the hydrogen gas passing through the flow rate regulator decreases when the temperature of the hydrogen gas becomes higher. Accordingly, in consideration of the quantity of heat of the heated hydrogen gas, a suitable flow rate of the hydrogen gas with respect to the needed quantity of heat can be supplied to the combustion nozzle.

The hydrogen gas is released from the combustion nozzle by the flow speed regulator such that the flow speed of the hydrogen gas increases when the flow rate of the hydrogen gas passing through the flow rate regulator decreases. That is, since the hydrogen gas heated to a higher temperature is released from the combustion nozzle at a higher flow speed, a combustion region of the hydrogen gas can be further widened. As a result, the temperature rise of a flame portion can be further suppressed, and the concentration of NOx generated during combustion can be further reduced.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 2 is a block diagram of a control device of the hydrogen gas burner device illustrated in FIG. 1;

FIG. 3A is a schematic view for describing a measurement principle of a temperature measuring instrument;

FIG. 7 is a control flowchart of the control device of the hydrogen gas burner device illustrated in FIG. 6.

DETAILED DESCRIPTION OF EMBODIMENTS

Hereinafter, two embodiments of a hydrogen gas burner device will be described referring to FIGS. 1 to 7.

First Embodiment

1. Hydrogen Gas Burner Device 1

Figure 1:
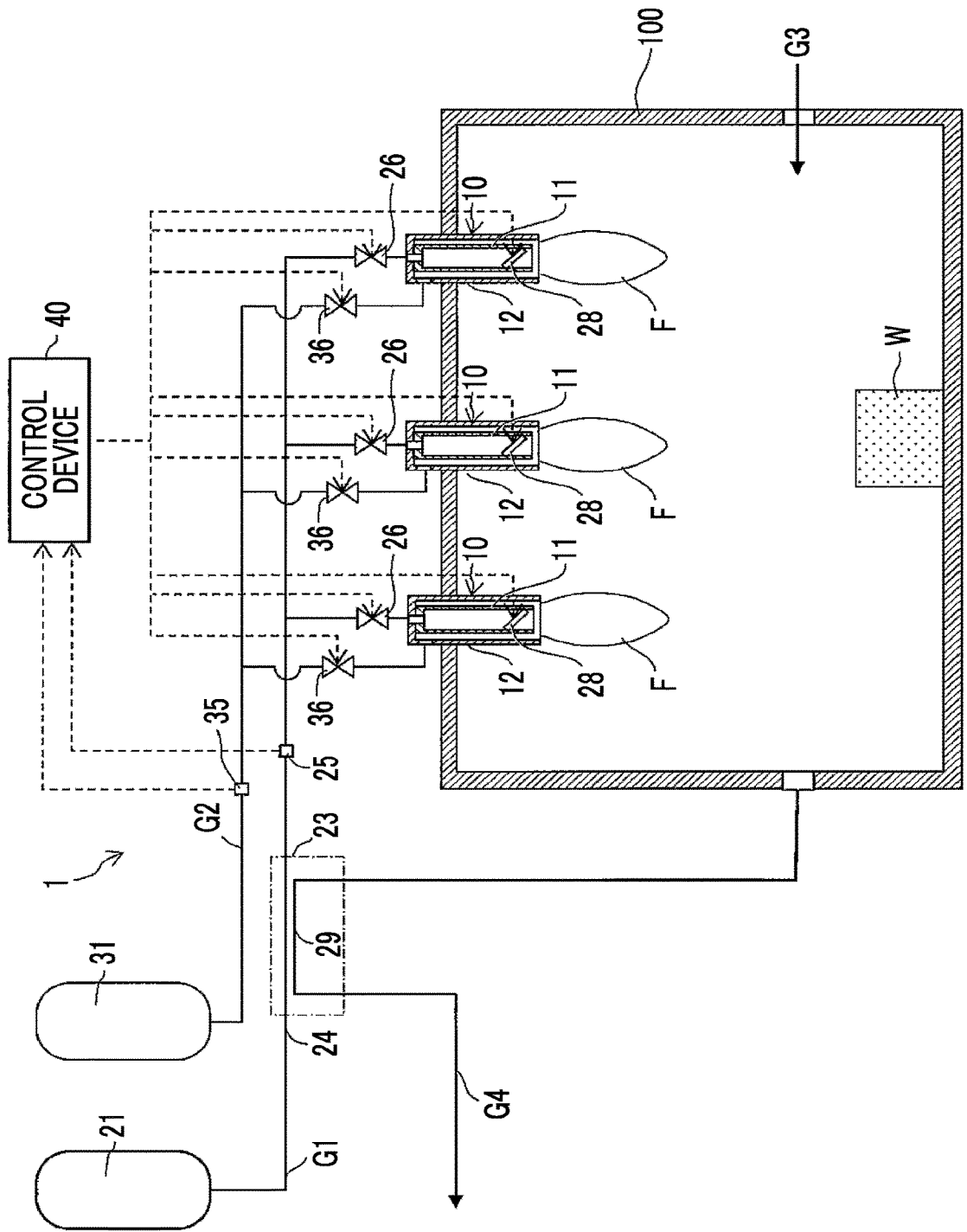
FIG. 1 is a schematic conceptual diagram of a hydrogen gas burner device related to a first embodiment.

FIG. 1 is a schematic conceptual diagram of a hydrogen gas burner device (hereinafter, a gas burner device) 1 related to the present embodiment, and is an example in which the gas burner device 1 is applied to a heating furnace 100 that heats a workpiece W through the combustion of hydrogen gas G1. As illustrated in FIG. 1, the gas burner device 1 related to the first embodiment is a device using the hydrogen gas G1 as fuel, and includes a combustion nozzle 10 to which the hydrogen gas G1, and a combustion-supporting gas G2 containing oxygen gas, are supplied.

Specifically, in the present embodiment, three combustion nozzles 10 are attached to an upper part of the heating furnace 100, and flames F are generated by igniting the hydrogen gas G1 released into the heating furnace 100 from the combustion nozzles 10.

In the present embodiment, the gas burner device 1 includes a hydrogen gas supply source 21, a heat exchanger (gas heater) 23, a temperature measuring instrument (temperature measuring part) 25, and a flow rate regulating valve (flow rate regulator) 26. The hydrogen gas G1 released from the hydrogen gas supply source 21 is heated by the heat exchanger 23. The heat exchanger 23 is disposed closer to an upstream side of the hydrogen gas G1 than the combustion nozzles 10. The hydrogen gas G1 flowing into a pipe 24 can be heated with the heat of the exhaust gas G4 by allowing exhaust gas G4 after the hydrogen gas G1 is combusted within the heating furnace 100 (to be described below) to flow to a heat transfer pipe 29 of the heat exchanger 23.

In the present embodiment, the heat exchanger 23 is used as the gas heater that heats the hydrogen gas G1 to be supplied to the combustion nozzles 10. In addition to this, however, for example, the hydrogen gas G1 may be directly heated using a heater as the gas heater. When the hydrogen gas G1 can be heated, the device configuration of the gas heater will not be limited.

The temperature measuring instrument (temperature measuring part) 25 measures the temperature of the hydrogen gas G1 heated by the heat exchanger 23, and is disposed upstream of the flow rate regulating valve 26. In the present embodiment, as illustrated in the left view of FIG. 3A, the temperature measuring instrument 25 is composed of two thermocouples 25a, 25b attached to the pipe 24 through which the hydrogen gas G1 flows. The two thermocouples 25a, 25b are disposed with different distances L1, L2 from the center of the pipe 24. In the present embodiment, the temperature measuring instrument 25 is constituted by the two thermocouples 25a, 25b. However, when the temperature of the hydrogen gas G1 can be measured, the device configuration of the temperature measuring instrument is not limited to this.

The flow rate regulating valve 26 regulates the flow rate of the hydrogen gas G1 that is heated by the heat exchanger 23 and is supplied to the combustion nozzles 10. The flow rate regulating valve 26 drives a valve body (not illustrated) of the flow rate regulating valve 26 by a control signal from a control device 40 to be described below to regulate the flow rate of the hydrogen gas G1 passing through the valve body.

In the present embodiment, the flow rate regulating valve 26 is provided as the flow rate regulator that regulates the flow rate of the hydrogen gas G1 to be supplied to the combustion nozzles 10. In addition to this, for example, the flow rate of the hydrogen gas G1 may be regulated by providing a valve body inside each combustion nozzle 10. When the flow rate of the hydrogen gas heated by the heat exchanger 23 can be regulated, the device configuration of the flow rate regulator is not particularly limited.

In the present embodiment, the gas burner device 1 further includes a regulating plate 28 that regulates the flow speed of the hydrogen gas G1 released from each combustion nozzle 10, downstream the flow rate regulating valve 26, and a drive device (not illustrated) that turns the regulating plate 28. The regulating plate 28 is a valve body and is disposed within a first cylinder tube 11 through which the hydrogen gas G1 of the combustion nozzle 10 flows.

Figure 3B:
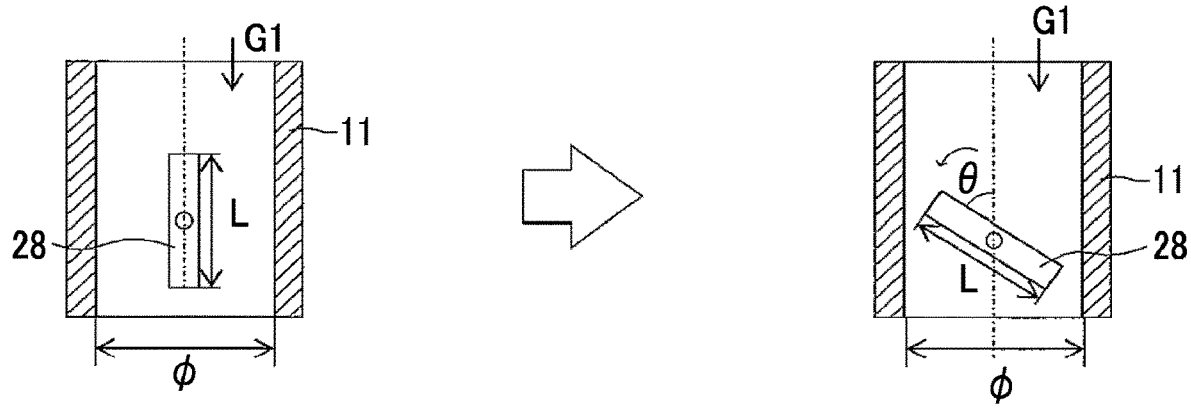
FIG. 3B is a schematic view for describing the operation of a regulating plate that regulates the flow speed of hydrogen gas.

The drive device is driven by the control signal from the control device 40 to be described below, and the regulating plate 28 turns as illustrated in a right view of FIG. 3B from a left view thereof. Accordingly, the apparent aperture (flow passage section) of the first cylinder tube 11 is controlled, and the flow speed of the hydrogen gas G1 is regulated.

In the present embodiment, the regulating plate 28 and the drive device are provided as a flow speed regulator that regulates the flow speed of the hydrogen gas G1 to be supplied to the combustion nozzle 10. In addition to this, however, for example, a regulating valve that regulates the flow speed of the hydrogen gas G1 may be provided between the flow rate regulating valve 26 and the combustion nozzle 10. When the flow speed of the hydrogen gas released from the combustion nozzle 10 can be regulated, the device configuration of the flow speed regulator is not particularly limited.

The gas burner device 1 includes a combustion-supporting gas supply source 31, a temperature measuring instrument (temperature measuring part) 35, and flow rate regulating valves (flow rate regulators) 36. The combustion-supporting gas G2 to be supplied from the combustion-supporting gas supply source 31 may contain oxygen gas, and may include, for example, air (ambient air), or gas in which inert gas is mixed with oxygen gas.

The temperature measuring instrument 35 measures the temperature of the combustion-supporting gas G2 to be supplied to the combustion nozzles 10, and is disposed upstream of the flow rate regulating valves 36. In the present embodiment, since the temperature measuring instrument 35 is the same as that of the temperature measuring instrument 25, the detailed description of the temperature measuring instrument 35 will be omitted.

Each flow rate regulating valve 36 regulates the flow rate of the combustion-supporting gas G2 to be supplied to the combustion nozzles 10, and drives a valve body (not illustrated) of the flow rate regulating valve 36 by a control signal from a control device 40 to be described below to regulate the flow rate of the combustion-supporting gas G2 passing through the valve body.

In the present embodiment, the flow rate regulating valve 36 is provided as the flow rate regulator that regulates the flow rate of the combustion-supporting gas G2 to be supplied to each combustion nozzle 10. However, for example, the flow rate of the combustion-supporting gas G2 may be regulated by providing a valve body inside the combustion nozzle 10.

The combustion-supporting gas G2 of which flow rate is regulated by the flow rate regulating valve 36 is supplied to the combustion nozzle 10. A second cylinder tube 12 through which the combustion-supporting gas G2 flows is formed in the combustion nozzle 10 so as to cover an outer periphery of the first cylinder tube 11 through which the hydrogen gas G1 flows. The hydrogen gas G1 flowing through the first cylinder tube 11 and the combustion-supporting gas G2 flowing through the second cylinder tube 12 are mixed together in a partial region on a tip side of the second cylinder tube 12. An ignition device (not illustrated) exemplified with an ignition plug for a pilot burner, or the like, is disposed in the aforementioned mixed region. The air-fuel mixture is ignited by the ignition device, and thereby, a flame F is generated. The ignition timing of the ignition device may be controlled by the control device 40.

In the present embodiment, carrier gas G3, such as hydrogen gas or air, may flow within the heating furnace 100. Accordingly, the gas after the hydrogen gas G1 is combusted is discharged from the heating furnace 100 as the exhaust gas G4 together with the carrier gas G3.

2. Control Device 40

The control device 40 includes, as hardware, for example, an input unit (not illustrated) that inputs a needed quantity of heat needed for the gas burner device 1, a calculating unit (not illustrated) that calculates a target flow rate, a target flow speed, and the like to be described below, and a storage unit (not illustrated) that stores numerical values needed for calculation. The control device 40 includes a configuration illustrated in FIG. 2 as software. FIG. 2 is a block diagram of the control device 40 of the gas burner device 1 illustrated in FIG. 1.

In the present embodiment, in the control device 40, the above-described calculating unit is at least provided with a gas temperature calculating unit 41, a target flow rate setting unit 43, a flow rate controller 44, a target flow speed setting unit 45, and a flow speed controller 47. The gas temperature calculating unit 41 calculates the temperature of the hydrogen gas G1 flowing into a center C of the pipe 24 from measurement results of the two thermocouples 25a, 25b measured by the temperature measuring instrument 25 (refer to the left view of FIG. 3A).

Specifically, a temperature T0 of the hydrogen gas G1 flowing through the center of the pipe 24 is calculated (refer to the right view of FIG. 3A), for example, by extrapolation using a linear function, from a distance L1 from the center C of the pipe 24 to the thermocouple 25a, a distance L2 from the center C of the pipe 24 to the thermocouple 25b, and temperatures T1, T2 measured by the thermocouples 25a, 25b. Similarly, the gas temperature calculating unit 41 also calculates the temperature of the combustion-supporting gas G2 flowing through the center of the pipe from the measurement results measured by the temperature measuring instrument 35.

The target flow rate setting unit 43 calculates a target flow rate of the hydrogen gas G1 to be supplied to the combustion nozzle 10 from the temperature of the hydrogen gas G1 heated by the heat exchanger 23 and from the needed quantity of heat of the hydrogen gas G1 needed for the gas burner device 1 during the combustion such that the flow rate of the hydrogen gas G1 passing through the flow rate regulating valve 26 decreases as the temperature of the hydrogen gas becomes higher, and sets the target flow rate of the hydrogen gas G1. The value of the temperature of the hydrogen gas G1 calculated by the gas temperature calculating unit 41 is used for the temperature of the hydrogen gas G1.

A target flow rate Qtr is calculated from the following Equation (1) in a case where the needed quantity of heat is defined as W, a reference flow rate at normal temperature (for example, 20° C.) is defined as Qn, the specific heat of the hydrogen gas is defined as C, a temperature difference between normal temperature and the temperature of the heated hydrogen gas G1 is defined as ΔT and a correction coefficient is defined as a.

$$Qtr = \alpha \cdot W \cdot Qn / (W + C \cdot \Delta T) \quad (1)$$

As is also apparent from Equation (1), when the temperature of the heated hydrogen gas G1 increases, heat quantity C·ΔT of the hydrogen gas G1 heated from the state of the normal temperature increases. Hence, according to the above Equation, the temperature difference ΔT becomes larger as the temperature of the heated hydrogen gas G1 becomes higher. As a result, the target flow rate Qtr decreases in a proportion of W/(W+C·ΔT). As mentioned above, according to the present embodiment, the flow rate of the hydrogen gas G1 in which the quantity of heat of the heated hydrogen gas G1 is taken into consideration can be calculated as the target flow rate Qtr.

In the present embodiment, the target flow rate setting unit 43 calculates the target flow rate Qtr of the hydrogen gas G1 according to Equation (1). However, when the target flow rate Qtr can be calculated such that the target flow rate Qtr decreases as the temperature of the hydrogen gas G1 heated by the heat exchanger 23 becomes higher, the aspect of the present disclosure is not limited to above-described Equation. The target flow rate Qtr may be extracted using a map between the temperature of the hydrogen gas G1 and the needed quantity of heat, and the target flow rate Qtr may be set from the map.

The target flow rate setting unit 43 calculates a target flow rate of the combustion-supporting gas G2 needed for combustion with respect to the set target flow rate Qtr of the hydrogen gas G1, and sets the target flow rate of the combustion-supporting gas G2. Specifically, the target flow rate of the combustion-supporting gas G2 is calculated such that the ratio of the target flow rate Qtr of the hydrogen gas G1 and the target flow rate of the combustion-supporting gas G2 becomes constant.

The flow rate controller 44 sends a control signal, through which the hydrogen gas G1 and the combustion-supporting gas G2 to be supplied to the combustion nozzle 10 reach the set target flow rates, to the flow rate regulating valves 26, 36, and controls the flow rate regulating valves 26, 36. In the present embodiment, the target flow rate of the combustion-supporting gas G2 is set and the flow rate regulating valve 36 is controlled. However, when the flow rate of the combustion-supporting gas G2 needed for combustion is always secured with respect to the target flow rate Qtr of the hydrogen gas G1; the control device 40 may omit the setting of the target flow rate of the combustion-supporting gas G2.

The target flow speed setting unit 45 calculates the target flow speed and sets the target flow speed such that the flow speed of the hydrogen gas G1 released from the combustion nozzle 10 via the regulating plate (flow speed regulator) 28 becomes a flow speed based on the target flow rate Qtr, and the flow speed of the hydrogen gas G1 increases as the value of the target flow rate Qtr decreases. Specifically, a turning angle θ (valve opening degree) of the regulating plate 28, which turns during control, as illustrated in the right view of FIG. 3B, is calculated from an uncontrolled state of the regulating plate 28 illustrated in the left view of FIG. 3B. The turning angle θ has a value according to the target flow speed of the hydrogen gas G1.

Specifically, the turning angle θ can be calculated by the following Equation (2) in a case where the diameter of the first cylinder tube 11 of the combustion nozzle 10 is defined as φ and the length of the regulating plate 28 is defined as 1.

$$\theta = \sin^{-1}(\phi/1((Qn-Qtr)/Qtr)^{1/2}) \quad (2)$$

As is also apparent from Equation (2), the turning angle θ is calculated such that the turning angle θ increases as the target flow rate Qtr of the hydrogen gas G1 decreases.

In the present embodiment, the turning angle θ corresponding to the target flow rate Qtr of the hydrogen gas G1 is calculated by using Equation (2). However, for example, other equations different from Equation (2) may be used when the turning angle θ can be calculated such that the turning angle θ increases as the target flow rate Qtr of the hydrogen gas G1 decreases. Additionally, the turning angle θ may be calculated from a table of a correspondence relationship between the target flow rate Qtr and the turning angle θ.

The flow speed controller 47 sends a control signal to the drive device that drives the regulating plate 28 such that the regulating plate 28 turns at the turning angle θ set based on the target flow speed, and controls the turning angle θ of the regulating plate 28. Accordingly, the flow speed of the hydrogen gas G1 released from the combustion nozzle 10 can be controlled.

In the present embodiment, the target flow rate Qtr is set such that the flow rate of the hydrogen gas G1 decreases as the temperature of the hydrogen gas G1 increases, and the turning angle θ is calculated such that the turning angle θ increases as the value of the target flow rate Qtr decreases. That is, as the temperature of the hydrogen gas G1 rises, the turning angle θ increases and the target flow speed of the hydrogen gas G1 released from the combustion nozzle 10 increases.

As a result, since the hydrogen gas G1 heated to a higher temperature is released from the combustion nozzle 10 at a higher flow speed, a combustion region of the hydrogen gas G1 becomes wider (the flame F becomes larger). As described above, the temperature of the portion of the flame F can be kept from becoming higher, and NOx concentration can be further kept from increasing during combustion.

Figure 4:
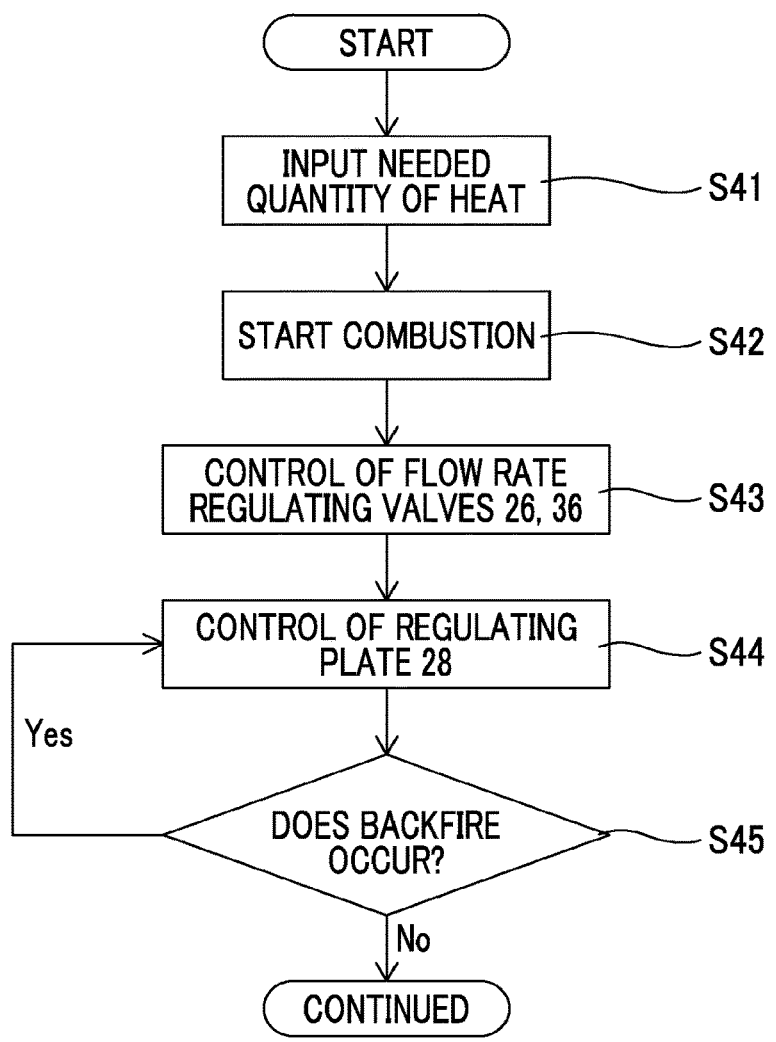
FIG. 4 is a control flowchart of the control device of the hydrogen gas burner device illustrated in FIG. 2.

Hereinafter, a control flow of the control device 40 of the gas burner device 1 will be described, referring to FIG. 4. FIG. 4 is a control flowchart of the control device 40 of the gas burner device 1 illustrated in FIG. 2. First, in Step S41, the needed quantity of heat needed for the gas burner device 1 is input to the control device 40. In Step S41, the needed quantity of heat is input. However, for example, a target temperature that should rise within the heating furnace 100 may be input to the control device 40, and the needed quantity of heat may be calculated from the input target temperature.

The process proceeds to Step S42 in which combustion is started. Specifically, the hydrogen gas G1 and the combustion-supporting gas G2 are supplied to the combustion nozzle 10 in conformity with the needed quantity of heat, and the hydrogen gas G1 is combusted, and the hydrogen gas G1 is heated using the heat exchanger 23. The temperatures of the hydrogen gas G1, and the combustion-supporting gas G2 are measured by the temperature measuring instruments 25, 35. Specifically, the temperatures of the hydrogen gas G1 and the combustion-supporting gas G2 are calculated by the gas temperature calculating unit 41. The process proceeds to Step S43 in a state where the temperature of the heated hydrogen gas G1 is stable.

The process proceeds to Step S43 in which the target flow rates of the hydrogen gas G1 and the combustion-supporting gas G2 are set as described above by the target flow rate setting unit 43 and the flow rate controller 44 controls the flow rate regulating valves 26, 36 such that the hydrogen gas G1 and the combustion-supporting gas G2 have the target flow rates.

The process proceeds to Step S44 in which the turning angle of the regulating plate 28 equivalent to the target flow speed of the hydrogen gas G1 is set by the target flow speed setting unit 45 and the flow speed controller 47 controls the regulating plate 28 such that the hydrogen gas G1 has the target flow speed.

The process proceeds to Step S45 in which whether or not a backfire occurs is determined when the flame F is generated. Specifically, whether or not the backfire occurs is determined from a temperature measured by a thermometer (not illustrated) disposed inside the combustion nozzle 10. In Step S45, in a case where the backfire occurs, the process returns to Step S44 in which the regulating plate 28 is controlled such that the flow speed of the hydrogen gas G1 increases. On the other hand, in a case where the backfire does not occur, the flame F is continuously generated.

According to the present embodiment, since the hydrogen gas G1 before combustion is heated upstream of the combustion nozzle 10, the quantity of heat generated during the combustion of the hydrogen gas G1 can be compensated for. The flow rate of the heated hydrogen gas G1 is regulated from the temperature and the needed quantity of heat of the heated hydrogen gas G1 such that the flow rate of the hydrogen gas G1 passing through the flow rate regulating valve 26 decreases when the temperature of the hydrogen gas G1 becomes higher. Accordingly, in consideration of the quantity of heat of the heated hydrogen gas G1, a suitable flow rate of the hydrogen gas G1 with respect to the needed quantity of heat can be supplied to the combustion nozzle 10, and excessive consumption of the hydrogen gas G1 can be further suppressed.

The hydrogen gas G1 is released from the combustion nozzle 10 such that the flow speed of the hydrogen gas G1 increases when the flow rate of the hydrogen gas G1 passing through the flow rate regulating valve 26 decreases. That is, since the hydrogen gas G1 heated to a higher temperature is released from the combustion nozzle 10 at a higher flow speed, the combustion region of the hydrogen gas G1 can be further widened. As a result, the temperature rise of the portion of the flame F can be further suppressed, and the concentration of NOx generated during combustion can be further reduced.

Second Embodiment

Figure 5:
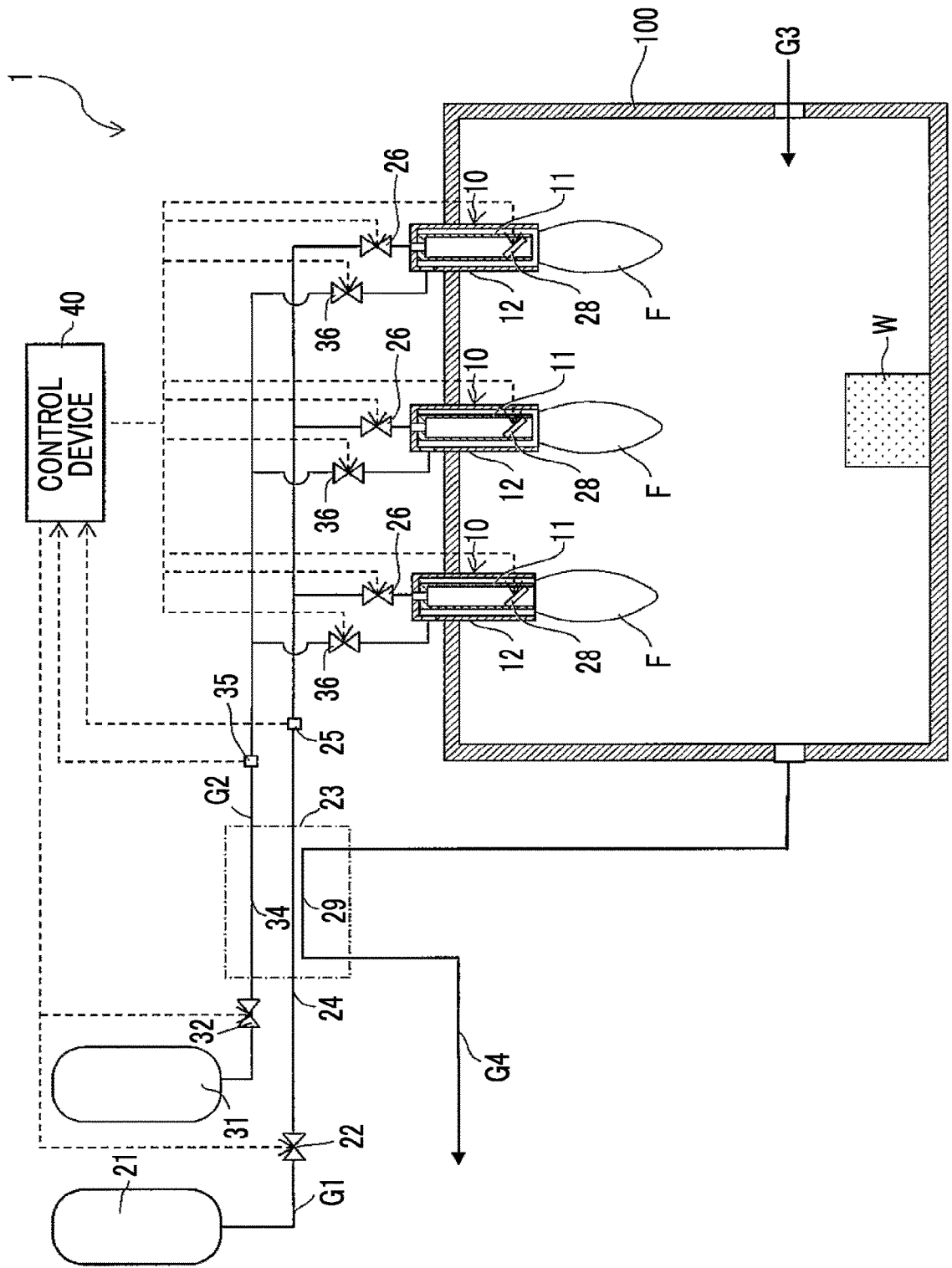
FIG. 5 is a schematic conceptual diagram of a hydrogen gas burner device related to a second embodiment.
Figure 6:
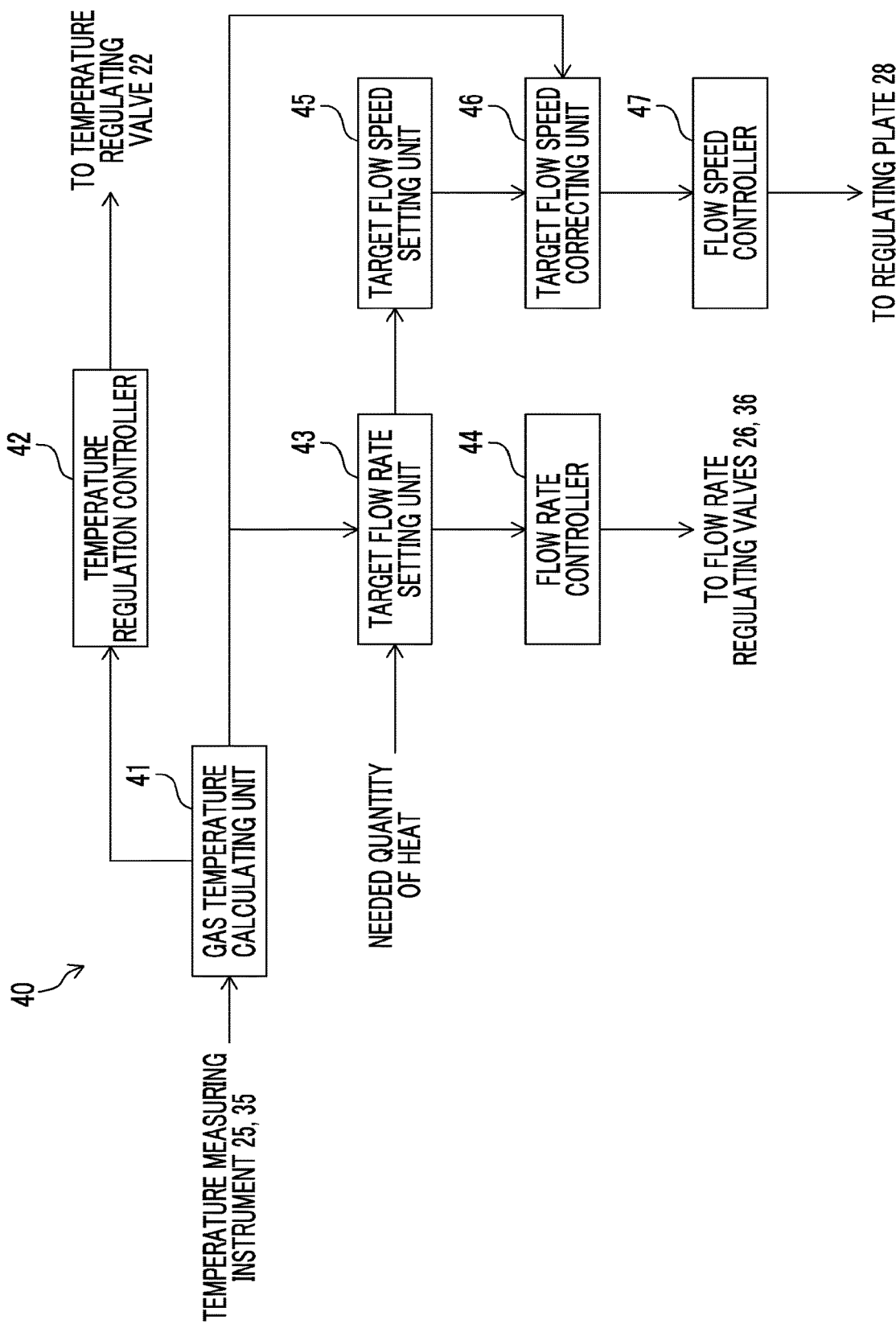
FIG. 6 is a block diagram of a control device of the hydrogen gas burner device illustrated in FIG. 5.

FIG. 5 is a schematic conceptual diagram of a gas burner device 1 related to a second embodiment. FIG. 6 is a block diagram of a control device 40 of the gas burner device 1 illustrated in FIG. 5. The gas burner device 1 related to the second embodiment is different from that of the first embodiment in that the combustion-supporting gas G2 is further heated by the heat exchanger 23, the temperature regulating valves 22, 32 are provided, and control is performed by the control device 40. Hereinafter, solely differences will be described, and other portions will be designated by the same reference signs as those of the gas burner device 1 of the first embodiment and the detailed description thereof will be omitted.

As illustrated in FIG. 5, the heat exchanger 23 of the gas burner device 1 related to the present embodiment also heats the combustion-supporting gas G2 flowing into a pipe 34 with the heat of the exhaust gas G4. The gas burner device 1 includes the temperature regulating valve (temperature regulator) 22 that regulates the temperature of the hydrogen gas G1 to be heated, by regulating the flow rate of the hydrogen gas G1 to be heated by the heat exchanger (gas heater) 23. Similarly, the gas burner device 1 further includes the temperature regulating valve (temperature regulator) 32 that regulates the temperature of the combustion-supporting gas G2 to be heated, by regulating the flow rate of the combustion-supporting gas G2.

The temperature regulating valve 22 is disposed between the hydrogen gas supply source 21 and the portion of the pipe 24 of the hydrogen gas G1 to be heated by the heat exchanger 23. For example, in a case where the temperature of the heated hydrogen gas G1 is higher than the set temperature, the temperature regulating valve 22 regulates the flow rate of the hydrogen gas G1 through a control signal from the control device 40 so as to increase the flow rate of the hydrogen gas G1. Similarly, the temperature regulating valve 32 is disposed between the combustion-supporting gas supply source 31 and the portion of the pipe 34 of the combustion-supporting gas G2 to be heated by the heat exchanger 23. For example, in a case where the temperature of the heated combustion-supporting gas G2 is high, the temperature regulating valve 32 regulates the flow rate of the combustion-supporting gas G2 through a control signal from the control device 40 so as to increase the flow rate of the combustion-supporting gas G2.

In the present embodiment, as illustrated in FIG. 6, the control device 40 further includes a temperature regulation controller 42 that controls the temperature regulating valves 22, 32 so as to limit the upper limit temperatures of the hydrogen gas G1 and the combustion-supporting gas G2 to be heated by the heat exchanger (gas heater) 23.

Specifically, when the temperatures of the hydrogen gas G1 and the combustion-supporting gas G2 calculated by the gas temperature calculating unit 41 become an upper limit temperature of 450° C. or lower, the temperature regulation controller 42 controls the temperature regulating valves 22, 32 so as not to exceed the upper limit temperature. The temperature regulation controller 42 controls the temperature regulating valve 22 (32) such that the flow rate of the heated hydrogen gas G1 (combustion-supporting gas G2) increases. Accordingly, the upper limit temperature of the hydrogen gas G1 (combustion-supporting gas G2) to be heated is limited to 450° C.

When the hydrogen gas G1 exceeds 500° C., there is a possibility that the hydrogen gas G1 is combusted at an unexpected point. Accordingly, in the present embodiment, the upper limit temperatures of the hydrogen gas G1 and the combustion-supporting gas G2 are set to 450° C. However, when the temperatures of the hydrogen gas G1 and the combustion-supporting gas G2 to be heated by the heat exchanger 23 can always be maintained at 450° C. or lower, the temperature regulating valves 22, 32 can be omitted, and the temperature control of the hydrogen gas G1 and the combustion-supporting gas G2 may not be performed. Additionally, when the combustion-supporting gas G2 is not heated by the heat exchanger 23 like the first embodiment, the temperature regulating valve 32 and the like can be omitted, and the temperature control of the combustion-supporting gas G2 may not be performed.

In the present embodiment, the target flow rate setting unit 43 may calculate the target flow rate Qtr of the hydrogen gas G1 by adding, to Equation (1) illustrated in the first embodiment, an item in which the quantity of heat of the combustion-supporting gas G2 is taken into consideration based on the temperature of the heated combustion-supporting gas G2. Specifically, in the present embodiment, the target flow rate setting unit 43 calculates the target flow rate Qtr of the hydrogen gas G1 such that the target flow rate Qtr of the hydrogen gas G1 decreases as the temperature of the heated combustion-supporting gas G2 becomes higher. Accordingly, the quantity of heat of the heated combustion-supporting gas G2 can be compensated for with respect to the needed quantity of heat during combustion, the hydrogen gas G1 can be regulated to a more optimal flow rate, and excessive consumption of the hydrogen gas G1 can be further suppressed.

In the present embodiment, the control device 40 further includes a target flow speed correcting unit 46 that corrects the target flow speed set by the target flow speed setting unit 45, based on the temperature of the combustion-supporting gas G2 heated by the heat exchanger 23. Specifically, the quantity of heat of the combustion-supporting gas G2 released from the combustion nozzle 10 is calculated from the temperature of the combustion-supporting gas G2, and the target flow speed set by the target flow speed setting unit 45 is corrected such that the target flow speed set by the target flow speed setting unit 45 increases as the quantity of heat increases.

Accordingly, even when the temperature of the gas in which the hydrogen gas G1 and the combustion-supporting gas G2 are mixed together rises due to the heated combustion-supporting gas G2, the hydrogen gas G1 is released from the combustion nozzle 10 at a higher flow speed. Thus, the combustion region of the hydrogen gas G1 can be further widened. As a result, the temperature rise of the portion of the flame F can be further suppressed, and the concentration of NOx generated during combustion can be further reduced.

Hereinafter, a control flow of the control device 40 of the gas burner device 1 will be described, referring to FIG. 7. FIG. 7 is a control flowchart of the control device 40 of the gas burner device 1 illustrated in FIG. 6. First, in Step S71, similar to the first embodiment, the needed quantity of heat needed for the gas burner device 1 is input to the control device 40.

The process proceeds to Step S72 in which the hydrogen gas G1 is supplied to the combustion nozzle 10 in accordance with the needed quantity of heat and the hydrogen gas G1 is combusted. The flow rate regulating valves 26, 36 regulate the flow rates of the hydrogen gas G1 and the combustion-supporting gas G2 such that these flow rates become the target flow rates at the room temperature according to the needed quantity of heat.

The process proceeds to Step S73 in which the temperature regulating valves 22, 32 are controlled. For example, in order to raise the temperatures of the hydrogen gas G1 and the combustion-supporting gas G2, the temperature regulating valves 22, 32 are controlled such that the flow rates of the hydrogen gas G1 and the combustion-supporting gas G2 decrease.

The process proceeds to Step S74 in which whether or not the temperatures of the hydrogen gas G1 and the combustion-supporting gas G2 are 450° C. or lower are determined. In a case where the temperature of at least one of the hydrogen gas G1 and the combustion-supporting gas G2 exceeds 450° C., the process returns to Step S73. Here, in a case where the hydrogen gas G1 exceeds 450° C., the temperature regulating valve 22 is controlled such that the flow rate of the hydrogen gas G1 increases. In a case where the combustion-supporting gas G2 exceeds 450° C., the temperature regulating valve 32 is controlled such that the flow rate of the combustion-supporting gas G2 increases.

On the other hand, in Step S74, in a case where the temperatures of the hydrogen gas G1 and the combustion-supporting gas G2 are 450° C. or lower, the process proceeds to Step S75. The target flow rates of the hydrogen gas G1 and the combustion-supporting gas G2 are set as described above by the target flow rate setting unit 43 and the flow rate controller 44 controls the flow rate regulating valves 26, 36 such that the hydrogen gas G1 and the combustion-supporting gas G2 have the target flow rates.

The process proceeds to Step S76 in which the turning angle of the regulating plate 28 equivalent to the target flow speed of the hydrogen gas G1 is set by the target flow speed setting unit 45 and the regulating plate 28 is controlled so as to have the turning angle corrected by the target flow speed correcting unit 46.

The process proceeds to Step S77 in which whether or not a backfire occurs is determined when the flame F is generated, similar to the first embodiment. In Step S77, in a case where the backfire occurs, the process returns to Step S76 in which the regulating plate 28 is controlled such that the flow speed of the hydrogen gas G1 increases. On the other hand, in a case where the backfire does not occur, the flame F is continuously generated.

Although the embodiments of the present disclosure have been described above in detail, the aspect of the present disclosure is not limited to the above embodiments, and various design changes can be performed without departing the spirit of the present disclosure.

What is claimed is:

1. A hydrogen gas burner device comprising:
    a combustion nozzle to which hydrogen gas and combustion-supporting gas containing oxygen gas are supplied, the combustion nozzle being configured to combust the hydrogen gas;
    a gas heater disposed upstream of the combustion nozzle, the gas heater being configured to heat at least the hydrogen gas;
    a flow rate regulator configured to regulate a flow rate of the hydrogen gas to be heated by the gas heater and supplied to the combustion nozzle;
    a flow speed regulator disposed downstream of the flow rate regulator, the flow speed regulator being configured to regulate a flow speed of the hydrogen gas released from the combustion nozzle; and
    a control device configured to control the flow rate regulator and the flow speed regulator, wherein:
    the control device is configured to set a target flow rate of the hydrogen gas such that the flow rate of the hydrogen gas passing through the flow rate regulator decreases as a temperature of the hydrogen gas becomes higher, based on the temperature of the hydrogen gas heated by the gas heater, and a needed quantity of heat of the hydrogen gas needed for the hydrogen gas burner device during the combustion;
    the control device is configured to set a target flow speed such that the flow speed of the hydrogen gas released from the combustion nozzle via the flow speed regulator becomes a flow speed based on the target flow rate, and the flow speed of the hydrogen gas increases as a value of the target flow rate decreases; and
    the control device is configured to control the flow rate regulator such that the flow rate of the hydrogen gas reaches the target flow rate and to control the flow speed regulator such that the flow speed of the hydrogen gas reaches the target flow speed.

2. The hydrogen gas burner device according to claim 1, further comprising a temperature regulator configured to regulate the flow rate of the hydrogen gas to be heated by the gas heater so as to regulate the temperature of the hydrogen gas to be heated,
    wherein the control device is configured to control the temperature regulator so as to limit an upper limit temperature of the hydrogen gas to be heated by the gas heater.

3. The hydrogen gas burner device according to claim 1, wherein:
    the gas heater is configured to heat the hydrogen gas and the combustion-supporting gas; and
    the control device is configured to correct the set target flow speed based on a temperature of the combustion-supporting gas.

* * * * *